US007889909B2

(12) United States Patent
Shindo et al.

(10) Patent No.: US 7,889,909 B2
(45) Date of Patent: *Feb. 15, 2011

(54) PATTERN MATCHING METHOD AND PATTERN MATCHING PROGRAM

(75) Inventors: Hiroyuki Shindo, Hitachinaka (JP); Akiyuki Sugiyama, Hitachinaka (JP); Takumichi Sutani, Hitachinaka (JP); Hidetoshi Morokuma, Hitachinaka (JP); Hitoshi Komuro, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 971 days.

This patent is subject to a terminal disclaimer.

(21) Appl. No.: 11/723,577

(22) Filed: Mar. 21, 2007

(65) Prior Publication Data
US 2007/0223803 A1 Sep. 27, 2007

(30) Foreign Application Priority Data
Mar. 22, 2006 (JP) .............................. 2006-077955

(51) Int. Cl.
*G06K 9/00* (2006.01)
(52) U.S. Cl. .................... 382/145; 382/147; 250/492.22
(58) Field of Classification Search ................. 382/141, 382/144, 145, 147, 149; 250/492.22
See application file for complete search history.

(56) References Cited
U.S. PATENT DOCUMENTS 6,069,971 A * 5/2000 Kanno et al. ................. 382/144

| 6,222,935 | B1 * | 4/2001 | Okamoto ..................... 382/149 |
| 6,240,202 | B1 * | 5/2001 | Yokoyama et al. .......... 382/149 |
| 6,285,783 | B1 * | 9/2001 | Isomura et al. ............. 382/147 |
| 6,396,943 | B2 * | 5/2002 | Yamashita ................... 382/144 |
| 6,504,947 | B1 * | 1/2003 | Nozaki et al. ............... 382/148 |
| 6,627,888 | B2 | 9/2003 | Yamaguchi et al. |
| 6,772,089 | B2 * | 8/2004 | Ikeda et al. ................. 702/159 |
| 6,872,943 | B2 | 3/2005 | Takane et al. |
| 2003/0173516 | A1 | 9/2003 | Takane et al. |
| 2004/0222375 | A1 | 11/2004 | Kimura et al. |

FOREIGN PATENT DOCUMENTS

| JP | 2001-243906 A | 9/2001 |
| JP | 2002-328015 A | 11/2002 |
| JP | 2003-90719 A | 3/2003 |
| JP | 2004-251674 A | 9/2004 |

* cited by examiner

*Primary Examiner*—John B Strege
(74) *Attorney, Agent, or Firm*—McDermott Will & Emery LLP

(57) ABSTRACT

It is an object of the invention to provide a suitable method for identifying depression/protrusion information in a design data; and a program and an apparatus for the same; for example, even in the case that similar portions are arranged, to provide a method for enabling a pattern matching with high precision between the design data and an image obtained by an image formation apparatus or the like; and a program and an apparatus for the same. To attain the above object, a pattern matching method, wherein, using information concerning a depression and/or a protrusion of the pattern on the design data, or a pattern portion and/or a non-pattern portion on the design data, pattern matching is executed between the pattern on the design data and the pattern on said image; and a program for the same are provided.

8 Claims, 8 Drawing Sheets 301
302

303
304

306
307

305

308

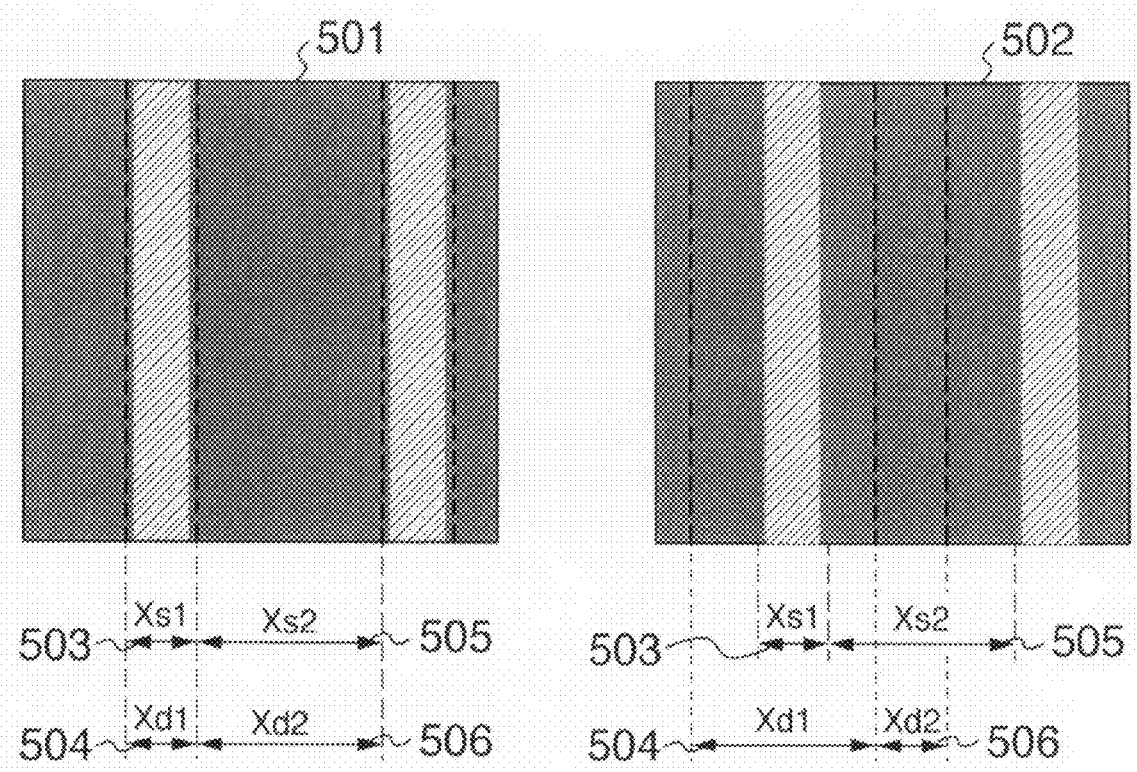

FIG. 7
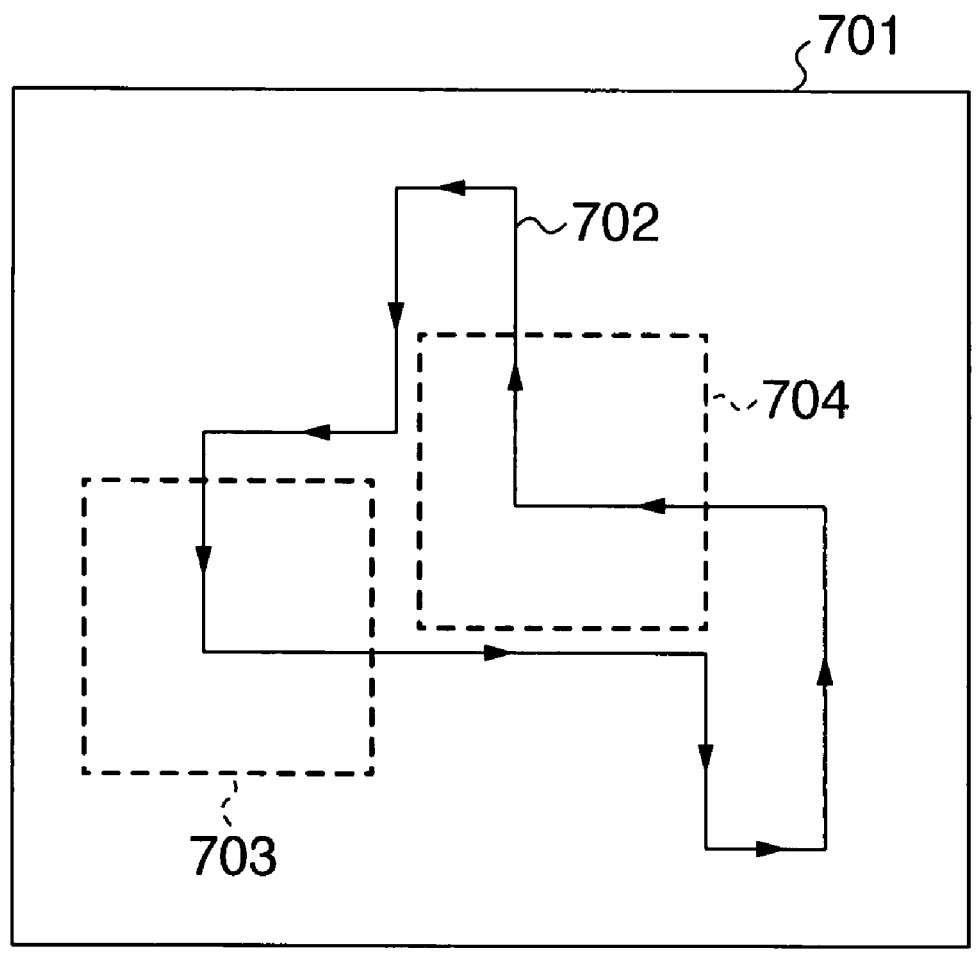
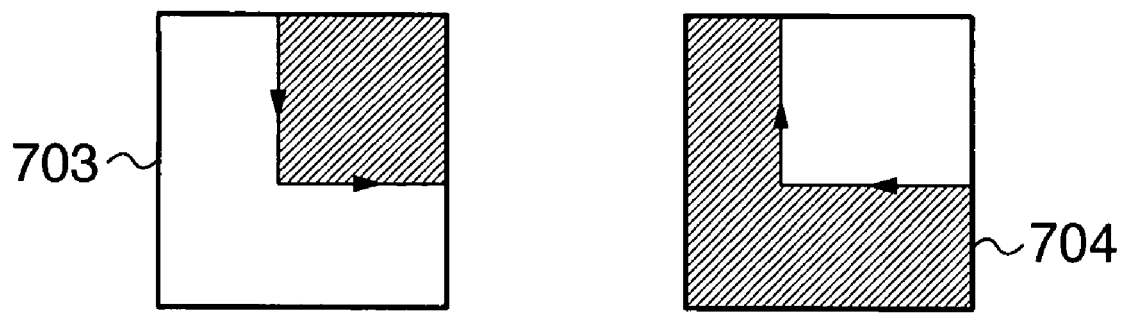

PATTERN MATCHING METHOD AND PATTERN MATCHING PROGRAM

BACKGROUND OF THE INVENTION

In a scanning electron microscope (SEM) or the like, which measures and inspects, for example, a semiconductor wafer, position checking of a field of view (FOV) or a scanning position to a desired measurement position is carried out, by using pattern matching technique. JP-A-2001-243906 (corresponding U.S. Pat. No. 6,627,888) explains an example of such a pattern matching method.

A pattern matching is carried out by measurement of coincidence between a pattern image, which is called a template and registered in advance, and an image obtained actually by SEM or the like. JP-A-2002-328015 (corresponding: US2003/0173516) explains an example of forming a template for pattern matching, based on a design data of a semiconductor element or the like. Formation of the template based on the design data has an advantage in that bothering to obtain an SEM image or the like can be eliminated.

JP-A-2003-90719 (corresponding U.S. Pat. No. 6,872,943) and JP-A-2004-251674 (corresponding: US2004/0222375) explain a technique to prevent failure in pattern matching caused by mistaking between a depression and a protrusion, by understanding a depression/protrusion state of a pattern, wherein the same shape monotonously continues, like line/space.

Because a template formed based on a design data is a drawing expressed by only lines which define a contour of a pattern, in the case of a pattern, wherein the same shape is monotonously repeated, like line/space, there is a problem that determination between a pattern portion and a non-pattern portion is difficult.

In particular, in the case of a line/space pattern, if the edge of a line pattern is located outside FOV, due to high magnification, there is a problem that it is difficult to determine which of a line part (a protrusion), or a space part (a depression), a region defined by two lines corresponds to. Techniques disclosed in Patent Documents 3 and 4 were directed to depression/protrusion determination in a SEM image, and not to depression/protrusion determination in a design data.

SUMMARY OF THE INVENTION

It is an object of the invention to provide a suitable method for identifying depression/protrusion information in a design data; and a program and an apparatus for the same; for an example, even in such a pattern that similar portions are arranged, to provide a method for enabling a pattern matching with high precision between a design data, and an image obtained by an image formation apparatus or the like; and a program and an apparatus for the same.

According to the invention, to attain the above object, the following are provided: a pattern matching method, wherein matching is executed between a pattern on a design data, and a pattern on an image obtained by an image formation apparatus; a program to realize the method, and an apparatus for the same; characterized in that by using information concerning a depression and/or a protrusion of the pattern on the design data, or a pattern portion and/or a non-pattern portion on the design data, the pattern matching is executed between the image on the design data, and the pattern on said image; and a program and an apparatus for the same.

According to the above configuration, because matching can be executed, not on the basis of a mere drawing, but on the basis of information concerning a depression and/or a protrusion of the pattern on the design data, or the pattern portion and/or the non-pattern portion on the design data, it is capable of preventing failure in pattern matching caused by mistaking the pattern part for the non-pattern part.

Other objects, features and advantages of the invention will become apparent from the following description of the embodiments of the invention taken in conjunction with the accompanying drawings.

BRIEF DESCRIPTION OF THE DRAWINGS

FIG. 5 is a drawing for explaining a pattern shape comparison for verifying a pattern matching result, according to one embodiment of the invention.

FIG. 7 is a drawing for explaining an embodiment to cut out a part of a design data of a complicated shape, as a matching pattern.

DESCRIPTION OF THE EMBODIMENTS

Figure 1:
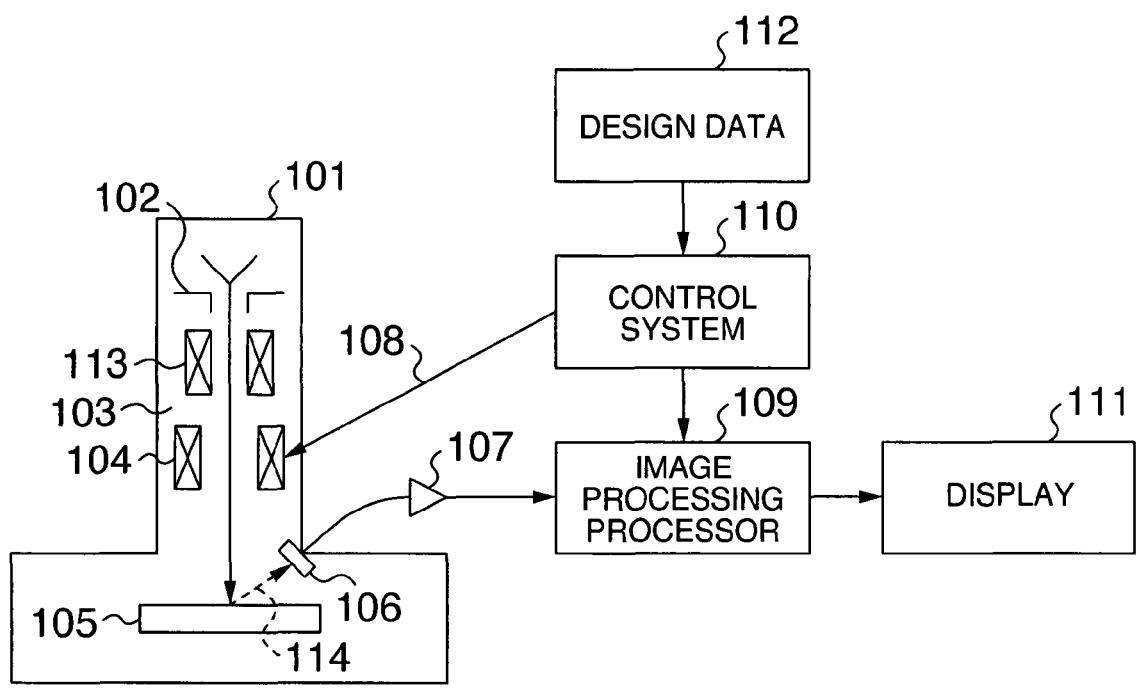
FIG. 1 is a drawing for explaining an outline of a scanning electron microscope.

An inspection object of a critical-dimension scanning electron microscope, which is one kind of a semiconductor inspection apparatus, is a pattern prepared on a semiconductor wafer in production of a semiconductor chip. When a structure of a semiconductor chip is analyzed by using a critical-dimension scanning electron microscope, because inspection is performed automatically and continuously, position checking by image processing is required. Therefore, before automatic and continuous inspection, it is necessary to specify imaging conditions, conditions for position checking by image processing, and inspection conditions for inspection items or the like.

Position checking by image processing is called pattern matching. Pattern matching requires a registration, in advance, of a pattern having a characteristic shape, separately from an inspection object, to automatically search an inspection position. As this registered pattern, for example, an image obtained by imaging an inspection object by a critical-dimension scanning electron microscope, contour line information calculated from an image obtained by imaging, an image of a designed pattern like CAD data or the like, contour line information of the design pattern or the like, is used. Pattern matching is carried out using this registered pattern for a pattern to be inspected, which is an image obtained by imaging every time of inspection.

The use of an image of a design pattern of CAD data or the like, as an inspection pattern has advantages in providing easy register of the inspection pattern, and also reduced period occupied by a critical-dimension scanning electron microscope, along with improvement of an operating rate of the critical-dimension scanning electron microscope, because imaging of an inspection object is not required to register as an inspection pattern; however, in pattern matching, wherein the design data and an image obtained by imaging using an electron microscope image of a semiconductor wafer are used as patterns to be inspected, pattern matching sometimes results in failure, because of a problem that the pattern on a semiconductor wafer changes in shape.

In particular, pattern matching is difficult in a pattern which has no characteristic shape, and is monotonously repeated, like a pattern composed of only lines.

In pattern matching with respect to a design data of CAD data or the like, and an image obtained by using an electron microscope, in the case of a pattern which has no characteristic shape, like a pattern composed of only lines, and is monotonously repeated, or the case that, in such a pattern, a shape to be inspected changes from a registered pattern, a conventional matching method had a problem that pattern matching sometimes resulted in failure caused by insufficient information to identify a matching position.

Explanation below relates to, in the pattern described above, a technique enabling a pattern matching of center position between the CAD data or the like, and the image obtained by imaging using an electron microscope.

Explanation will be given below on execution of pattern matching between a pattern on the design data, and a pattern on an image, by utilization of information concerning a depression and/or a protrusion of a pattern on a design data, or a pattern portion and/or a non-pattern portion on a design data. As for an example thereof, explanation will be given below on determining depression/protrusion information of a pattern, from an inspection pattern by the addition of vector information (information on the direction attaching to a side to be formed with the pattern) including depression/protrusion information of the pattern, to contour lines of the design data, in register of the inspection pattern. Further, from an image obtained by imaging using an electron microscope, by utilization of a known depression/protrusion determining method, depression/protrusion information of an inspection object pattern is obtained, and a center position of a depression or a protrusion of each of the patterns can be calculated. Explanation will be given bellow on that, by utilization of these sorts of information, calculation of coincidence between two center positions of the inspection pattern and the inspection object pattern, enables a determination, that a point with the highest coincidence is a correct pattern matching position.

In addition, an explanation will be given on possibility of improvement of entire matching precision higher, by a pattern shape recognition from the inspection pattern prepared from the design data, automatic recognition whether or not a pattern matching method utilizing the above depression/protrusion information is suitable, or a conventional pattern matching method is suitable, so as to switch a pattern matching method thereby.

It should be noted that, explanation will be given below on an embodiment for execution of pattern matching between an image obtained by SEM, which is one kind of an image formation apparatus, and a design data, however, the embodiment is not limited thereto; for example, the embodiment may be applied to a matching between a SIM (Scanning Ion Microscope) image obtained by scanning ion beams on a sample, or a pattern displayed on an optical microscope image obtained by irradiating laser beams, and a pattern on the design data.

FIG. 1 is a block diagram of an outline configuration of a scanning electron microscope. The electron beams 103 emitted from the electron gun 102 in the electron microscope 101 are converged by the electron lens 113, and irradiated onto the sample 105. Intensity of the secondary electrons 114, or reflection electrons generating from the surface of the sample 105 by irradiation of electron beams are detected by the electron detecting unit 106, and amplified by the amplifying unit 107. The electron beams 103 are raster scanned on the surface of the sample 105 by the deflector 104, which shifts an irradiation position of the electron beams 103 according to the control signal 108 of the control system 110. A signal output from the amplifying unit 107 is subjected to AD conversion in the image processing processor 109 to generate a digital image data. The display 111 is an apparatus, which displays an image data. In the design data 112 of a semiconductor chip like a CAD data or the like, a region to be inspected can be specified in an arbitrary manner. The control system 110 executes control for imaging or inspection of a semiconductor wafer, or communication to the image processing processor 109, using information of the design data 112 and the region to be inspected. A system configured by the electron microscope 101, the image processing processor 109, the control system 110, the display 111 and a storing apparatus of the design data 112 has a communication unit for data exchange.

The image processing processor 109 executes pattern matching between the design data and the image obtained, based on a program registered in the control system 110 or the image processing processor 109. It should be noted that, while various methods may be used with respect to matching processing, it is desirable to use a normalized correlation method, wherein, by taking correlation of two images, the coincidence is determined. It should also be noted that the image processing processor 109 or the control system 110 according to the embodiment, is provided with a program which enables to add information from an input apparatus or the like, not shown, to each of the drawings or the pattern recorded in the design data. The added information is, as will be described later, information on a depression and/or a protrusion of a pattern, or information on a pattern portion (for example, a line pattern) and/or a non-pattern portion (for example, a space portion present between line-patterns). The information added in this manner is expressed in a displaying form as will be described later, on the display 111.

In addition, the above program can be distributed as a computer readable medium, and is applicable irrespective of a specified type of a medium used for a practical distribution. Such a computer readable medium includes a recordable type medium such as a flexible disk, a CD-ROM or the like, along with a transmittable type medium like digital and analog communication links or the like.

Figure 2:
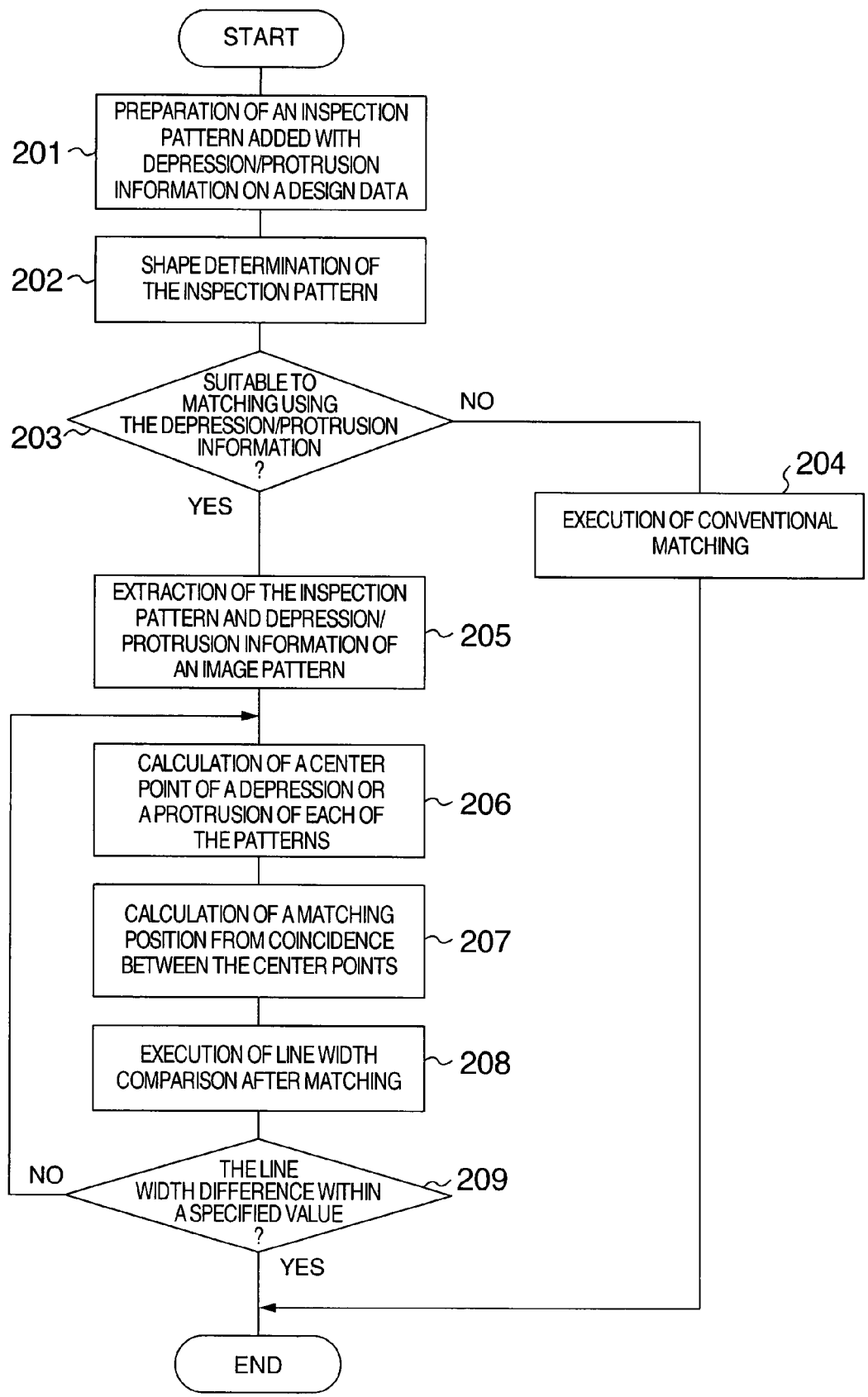
FIG. 2 is a flowchart for explaining a pattern matching processing between a design data utilizing depression/protrusion information of a pattern, and an image obtained by imaging using a scanning electron microscope, according to one embodiment of the invention.
Figure 3A:
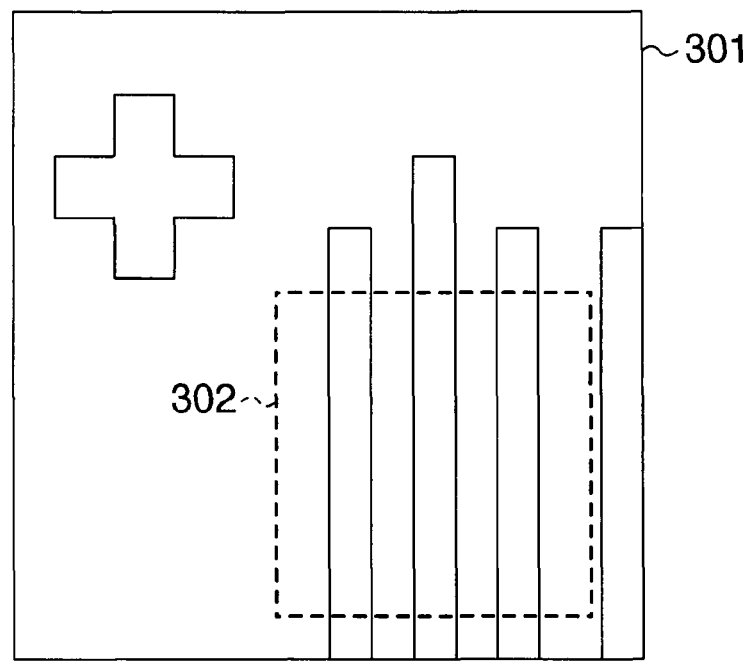
FIGS. 3A, 3B, 3C, 3D and 3E are drawings for explaining a method for adding depression/protrusion information to a pattern, according to one embodiment of the invention.
Figure 3B:
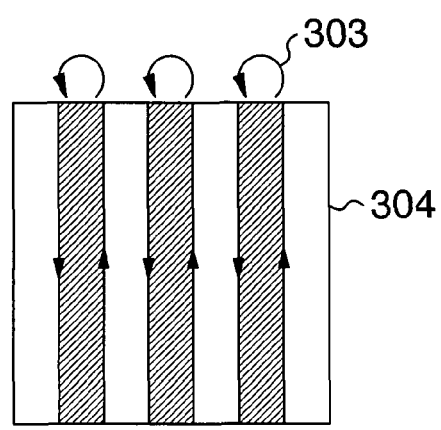
Figure 3C:
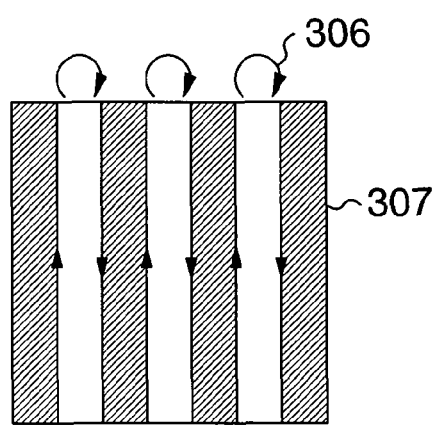
Figure 3D:
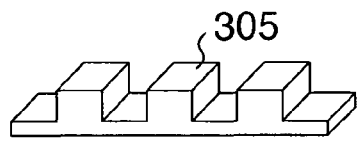
Figure 3E:
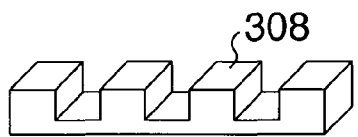

FIG. 2 shows, according to an embodiment of the invention, a flowchart of pattern matching processing between the design data utilizing depression/protrusion information of a pattern, and an image pattern obtained by imaging using a scanning electron microscope. The design data, hereinafter, represents information indicating an exterior structure of CAD data or the like, in designing LSI prepared by a semiconductor, a semiconductor exposure mask, liquid crystal or the like. In the invention, because the design data and the depression/protrusion information of a pattern from an image obtained by imaging using a scanning electron microscope are used, first of all, an inspection pattern added with depression/protrusion information to the design data is prepared 201. Normally, the design data including a semiconductor circuit or the like, is expressed in a closed drawing; however, on an actual pattern, because whether or not the inside of the closed drawing becomes a depression or a protrusion depends on a mask setting, or whether or not a resist is positive resist or a negative resist, it is impossible to determine a depression or a protrusion of a pattern, from the design data. Therefore, in order to determine whether or not the pattern of the design data is a depression or a protrusion, from a mask setting and information on a resist kind, so as to make it possible to obtain the information easily from the design data, lines of the closed drawing of the design data are uniformly expressed in a fixed direction, matching to depression/protrusion information. In this way, even in the case that a part of the pattern is cut out, as an inspection pattern, from the design data, it is possible to draw out depression/protrusion information of the pattern from vector information of the drawing lines. In addition, in depression/protrusion information of the design data, even in the case where information on the mask setting and resist information as above are not present, by executing pattern matching first by an arbitrary inspection pattern, and obtaining depression/protrusion information of a pattern of an image obtained by imaging using a scanning electron microscope, it is possible to determine whether or not the closed drawing of the design data is a depression or a protrusion on an actual pattern.

Step 202 for shape determination of the inspection pattern determines a shape of a pattern cut off from the design data as the inspection pattern, based on number of lines configuring each of drawings, vector information, and drawing arrangement coordinates. As an example of a pattern shape to be determined, there are a line pattern, a line edge pattern, a striking pattern, a hole pattern or the like, and patterns other than the above-described specific patterns are determined as unique patterns. A method for determining each of inspection patterns is as follows; the case that an inspection pattern is composed of entirely parallel lines, is determined as a line pattern; the case that a rectangle cut out at the edge of an inspection pattern is arranged singly or in plurality in parallel, is a line edge pattern; the case that 2 rectangles cut out at the corresponding both edges of the inspection pattern, are arranged singly or in plurality in parallel, is a striking pattern; while the case of rectangle arrangement pattern is a hole pattern.

The step 202 for inspection pattern shape determination automatically determines a pattern which has no characteristic shape and is monotonously repeated, which makes position checking hard by a conventional a pattern matching method; and also which is suitable to a pattern matching method using depression/protrusion determination; and automatically sorts pattern matching methods 203, so as to carry out a pattern matching method using depression/protrusion determination, for such a pattern kind, or to carry out a conventional pattern matching method (204) for a different pattern.

Then, the processing step 205 is performed, to extract depression/protrusion information of the inspection pattern and the image pattern obtained by imaging using a scanning electron microscope. The depression/protrusion information of the inspection pattern can be extracted in the flow 201 by utilization of added information. In addition, in the image pattern obtained by imaging using a scanning electron microscope, by analyzing profile waveform in the direction perpendicular to an edge of the pattern, which is a conventional method, it is possible to extract depression/protrusion information of the pattern. Further, as a method for obtaining depression/protrusion information of the image pattern obtained by imaging using a scanning electron microscope, there is a method for obtaining an image by irradiating beams over a semiconductor sample in the diagonal direction, as represented by a stereoscopic observation method or the like.

Then, using depression/protrusion information obtained by the flow 205, values between lines of a depression or a protrusion of the inspection pattern and the image pattern are obtained, and center positions of each of the patterns are obtained by the step 206. The step 207 checks coincidence between the centre positions within a matching region, and designates a position with the highest coincidence as the matching position. An example of a calculation method of coincidence of center positions of the inspection pattern and the image pattern includes that at each point of the inspection pattern and the image pattern within the matching region, the shortest distance between the center positions of the inspection pattern, and the image pattern is obtained to designate a point with the shortest distance, as the matching position.

Finally, at the matching position decided in the flow 207, to verify the pattern matching result, pattern line widths of the detection pattern and the image pattern, are compared (208), and when the width exceeds the upper limit of shape difference of the detection pattern and the image pattern, the pattern matching in the flow 207 is considered not correct, and then the depression/protrusion information of the detection pattern, or depression/protrusion information of the image pattern is turned upside down, to perform pattern matching again, using depression/protrusion information (209). This processing can prevent a setting mistake of depression/protrusion information in the design data, or pattern matching failure caused by failure in depression/protrusion determination processing, from an image obtained by imaging using a scanning electron microscope.

FIGS. 3A, 3B, 3C, 3D and 3E are drawings showing a method for the addition of depression/protrusion information when the image pattern 302 is prepared from the design data 301, according to one embodiment of the invention. Though the design data 301 is expressed with closed drawings, a starting point and an expression direction of each of drawings are not unified. Further, as described above, because whether or not the inside of the closed drawing becomes a depression or a protrusion depends on a mask setting, or whether or not a resist is positive resist or a negative resist, it is impossible to determine a depression or a protrusion of a pattern, from the design data.

To solve these problems, an expressing direction included in the inspection pattern is checked and line vector is changed, so as to provide expression entirely in the same direction. Here, as an example of checking the expressing direction of a closed drawing, so that the expressing direction of a complicated drawing is detect as well, it can be found that, when the summation of exterior products of vectors in each of the drawings is positive, the drawing is expressed clockwise, and when negative, the drawing is expressed anti-clockwise. After unification of the expressing direction of the closed drawing in the inspection pattern, whether or not the inside of the closed drawing is a depression or a protrusion is determined, from a mask setting and a resist kind, and in the case that the inside of the closed drawing becomes a protrusion on an actual pattern (the protrusion pattern 305), entire drawings included in the inspection pattern are unified anti-clockwise (the pattern expressing direction (anti-clockwise) 303). In the inspection pattern cut out in this manner, even in the case that a part of a drawing of the design data is cut out in preparation as the inspection pattern, depression/protrusion determination of the pattern from vector information becomes possible.

Further, in the case that the inside of the closed drawing becomes a depression on an actual pattern (the depression pattern 308), entire drawings included in the inspection pattern are unified clockwise (the pattern expressing direction (clockwise) 306). In the inspection pattern cut out in this manner as well, even in the case that a part of a drawing of the design data is cut out in preparation as the inspection pattern, depression/protrusion determination of the pattern from vector information becomes possible. In the case of the line pattern formed by cutting a part of a drawing of the design data, as in the inspection pattern 302, when a vector direction of lines composing the line is downward, it is found that the pattern varies from a depression to a protrusion seeing from the left, and that a part sandwiched between a downward vector and an upward vector, is a protrusion, and a part sandwiched between a downward vector and an upward vector, is a depression.

FIG. 7 is a drawing for explaining an embodiment to cut out a part of a design data of a complicated shape, as a matching pattern. Because the part 703 and the part 704 on the design data 701 as shown in FIG. 7, are the same shapes in view of the design data, in the case that the part 703 or the part 704 are simply cut out from the design data, there is a risk of incorrect matching to one side in pattern matching, however, as in the embodiment, the addition of the vector information 702 to the design data is capable of distinguishing the parts 703 from 704, and execution of matching based on the information is capable of improving success rate of matching.

As described above, according to the embodiment, based on the vector information attached to at least two sides, or two lines of the design data, determination is made whether or not a region defined by the two sides or two lines is a depression or a non-pattern portion, or a protrusion or a pattern portion. Naturally, depression/protrusion determination may be performed based on vector information on not less than three sides.

Vector information is capable of easily adding depression/protrusion information to the design data, because by setting at least one point of the pattern, the vector information can be developed along lines defining the pattern without executing a particularly complex processing.

In pattern matching between a design data and a SEM image, the pattern matching may be executed not only by correlating simply, but also by checking the depression/protrusion determination result of the design data described above, and the depression/protrusion determination result of the SEM image as explained in Patent Documents 3 and 4, so as to add the checking result.

Figure 8:
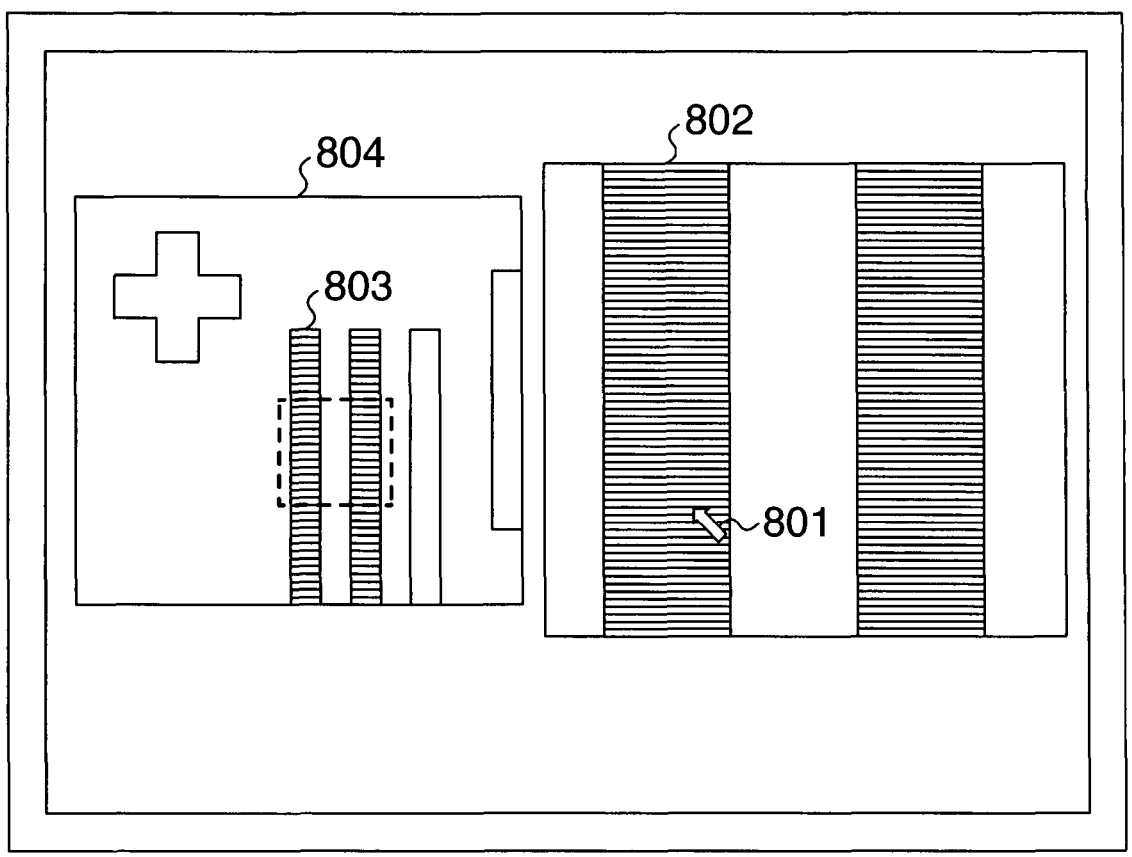
FIG. 8 is a drawing for explaining an embodiment to display together a design data with low magnification, and a design data with high magnification.

It should be noted that as another method for determining a pattern portion and a non-pattern portion, a closed drawing selected may be displayed so as to distinguish from other regions, along with displaying the design data 301 and the inspection pattern 302 on the display 111. Specifically, as shown in FIG. 8, when the pattern 802 is designated by the cursor 801, the closed drawing 803 to which the pattern 802 belongs, is displayed on the design data 804 (the image including a region in which at least an edge part of a pattern and the like, a pattern portion and a non-pattern portion can be identified) with low magnification, being distinguished from other regions. Displaying in this manner is capable of forming a matching pattern while confirming the state of pattern formation of the design data to be cut out.

In addition, not only by displaying simply, but also by adding data distinguishable from other regions on the design data, including coloring a designated closed drawing, even in the case of executing pattern matching by cutting out a part of a line/space pattern, a success rate of pattern matching can be enhanced. In this case, ideally, the design data is colored, or changed in color or the like, so that contrasting density ratio between a pattern portion and a non-pattern portion of the design data cut out, and a contrasting density ratio between a pattern portion and a non-pattern portion on the SEM image, are made the same or similar. In this manner, by registering the design data, as a template for pattern matching, in the added state of data distinguishable from other regions to the desired drawing, success rate of pattern matching equivalent to or higher than pattern matching based on mere lines can be expected.

Figure 4A:
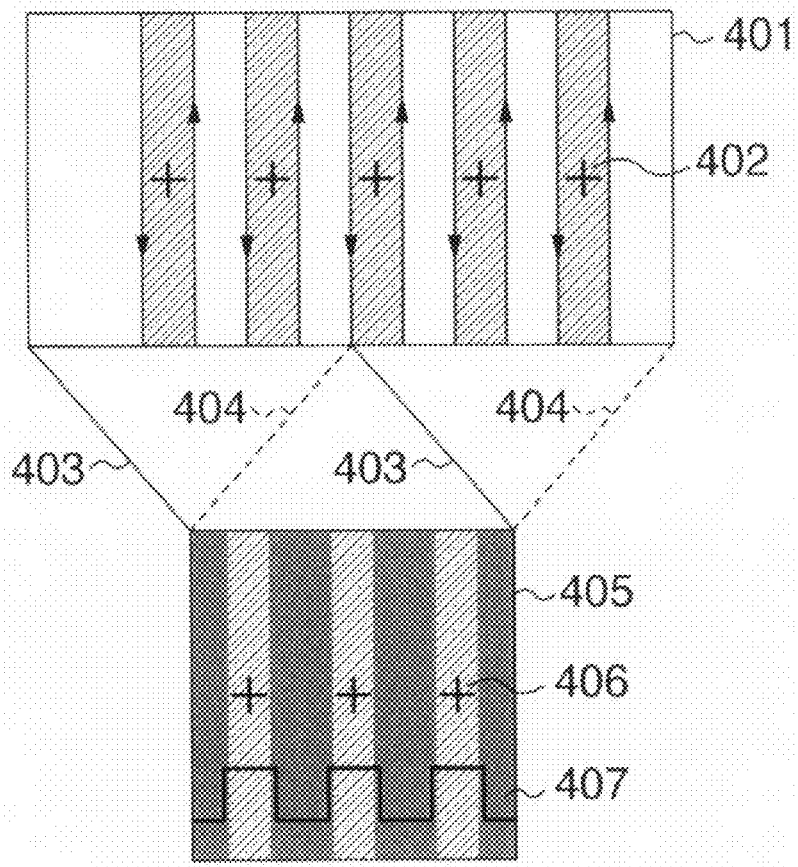
FIGS. 4A and 4B are drawings for explaining a technique for center point matching between a pattern prepared from a design data, and a depression, or a protrusion of an image pattern obtained by imaging using a scanning electron microscope, according to one embodiment of the invention.
Figure 4B:
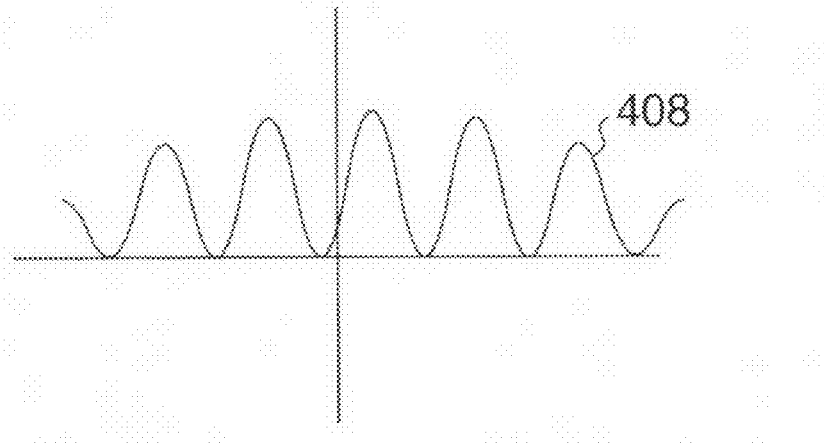
Figure 6A:
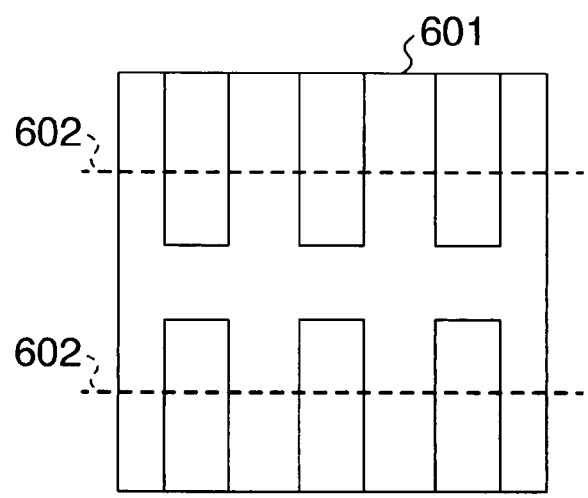
FIGS. 6A, 6B, 6C and 6D are drawings for explaining a pattern matching method utilizing depression/protrusion determination in a striking pattern and a hole pattern, according to one embodiment of the invention.
Figure 6B:
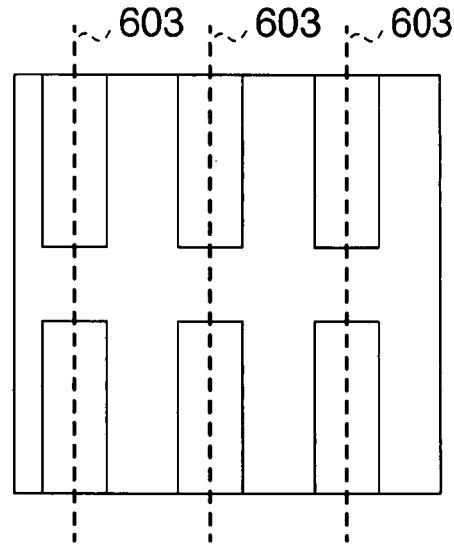
Figure 6C:
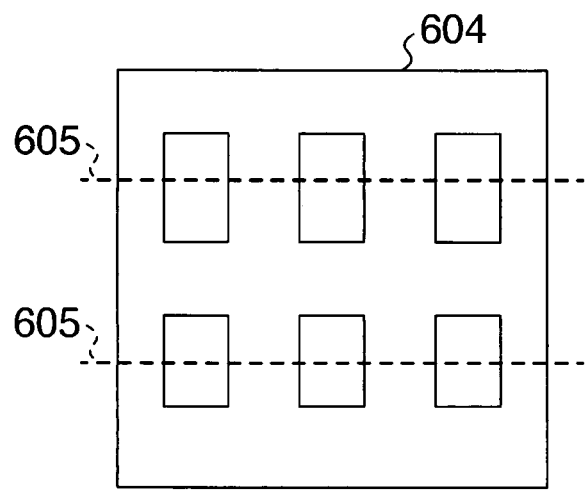
Figure 6D:
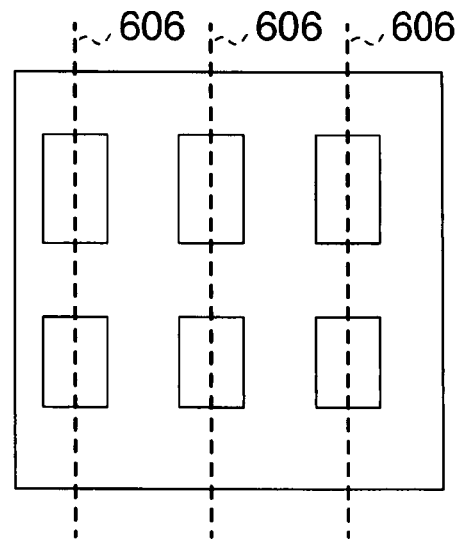

FIGS. 4A and 4B are drawings showing a technique for center point position matching between an inspection pattern prepared from a design data, and a depression, or a protrusion of an image pattern obtained by imaging using a scanning electron microscope, according to one embodiment of the invention. A protrusion of the inspection pattern 401 is obtained from vector lines, with the technique described above, to calculate the center position 402 of the protrusion. Secondly, from the image pattern 405 obtained from imaging by using a scanning electron microscope, utilizing a depression/protrusion determination method or the like using known line profile data, the depression/protrusion determination result 407 of the image pattern is judged. From the result, the centre position 406 of a protrusion of the image pattern is calculated. In the case of a line pattern like the inspection pattern 401 as an example, a matching position between the inspection pattern and the image pattern cannot unambiguously be decided with respect to the upward and downward directions. Therefore, in the case that the shape determination step of the inspection pattern determines as a line pattern, the matching direction is automatically set in the direction perpendicular to the lines.

Subsequently, to check coincidence of the center points, by obtaining a distance between the center positions from one end to another end of the matching region (from the inspection start position 403 to the inspection finish position 404), and by expressing coincidence of each point as the score 408, with weighing to the distance, coincidence of center positions can be obtained. After scoring in this manner, by obtaining a peak score, the point is determined as a matching position. However, in a repeating pattern including a line pattern, a plurality of peaks of coincidence appears. In this case, a position with a minimum position disagreement of pattern matching, that is, the nearest peak is designated as a matching position.

FIG. 5 is a drawing relating to a pattern shape comparison for verifying a pattern matching result, according to one embodiment of the invention. In pattern matching using the depression/protrusion determination, verification of the pattern matching result can be performed by score value of coincidence between the center positions of the inspection pattern and the image pattern described above, and a pattern shape comparison after getting the pattern matching result. The pattern shape comparison can be performed by comparing widths in the vertical and horizontal directions based on the pattern, however, in the cases of the line patterns 501 and 502, because a pattern position is uncertain, the shape comparison is performed by comparing widths of a pattern and a pattern interval. As the comparison method, by comparing the line width 503 of a pattern or an image pattern with a pattern interval, and the line width 504 of the inspection pattern, the larger one is expressed as a denominator, and the smaller one is expressed as a numerator in common fraction, to perform the pattern shape comparison. Further, with respect to patterns compared, adjacent patterns in a pattern interval, or a pattern interval, by similarly comparing the pattern interval 505 in the image pattern, and the pattern interval 506 in the inspection pattern, the larger one is expressed as a denominator, and the smaller one is expressed as a numerator in common fraction. By taking the average from values calculated in this manner, in the case that the value exceeds an upper limit of a shape variation ratio of the pattern, it is possible to determine failure in the pattern matching. The left drawing in FIG. 5 shows a success example in matching based on depression/protrusion determination, and the right drawing in FIG. 5 shows a failure example in matching.

FIGS. 6A, 6B, 6C and 6D are drawings showing a pattern matching method using depression/protrusion determination in a striking pattern and a hole pattern, according to one embodiment of the invention. Pattern matching in the striking pattern 601, and the arrangement pattern of the hole 604 require execution of matching in the horizontal direction, in addition to matching in the direction vertical to the pattern of the line pattern described above. In the striking pattern, first, with respect to the direction vertical to the pattern, pattern matching is executed by depression/protrusion determination.

The pattern center position determination based on depression/protrusion determination is executed in the entire patterns, in the case that edges in the longitudinal direction of the striking patterns, arranged in upper and lower parts of an image plane, are present at the same object positions in the horizontal direction (x-direction) of the image plane; while in the different case, the determination is executed in each of upper and lower patterns (the depression/protrusion determination position 602). After matching is executed in the x-direction, with respect to an edge formed along the pattern horizontal direction (y-direction) of the inspection pattern, pattern matching based on depression/protrusion determination information is executed (the depression/protrusion determination position 603). Matching with respect to an edge formed in the horizontal direction can also be executed, not by a pattern matching method using depression/protrusion determination information, but also by a conventional matching method. In the hole pattern, because depression/protrusion determination position of the image pattern is not certain, an edge position is extracted first from the image pattern. As for the extraction method for the edge position, there are a Sobel filter, a Laplacian filter, and a method using a binarization method, which are known image processing techniques. With respect to the edge position obtained by a method described above, the depression/protrusion determination is executed in regard to the edge in the vertical direction of the image pattern (the depression/protrusion determination position 605). In addition, using vector information of the inspection pattern, the depression/protrusion determination is executed in regard to the edge in the vertical direction of the inspection pattern. Thereby, the pattern matching is executed using the depression/protrusion determination described above to decide a matching position in the vertical direction. Finally, with respect to the edge in the horizontal direction of the pattern, the pattern matching is similarly executed (the depression/protrusion determination position 606), and a final matching position is decided.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A pattern matching method for executing matching between a pattern of a design data, and a pattern on an image obtained by an image formation apparatus, comprising steps of:
adding identification information of lines onto contour lines of pattern to said design data;
obtaining center positions of edges of pattern of said design data added with said identification information and pattern on said image; and
carrying out pattern matching such that said obtained center positions coincide with each other.

2. The pattern matching method according to claim 1, wherein the identification information of lines added with contour lines of pattern of said design data is expressed by a vector.

3. The pattern matching method according to claim 1, further comprising steps of:
expressing degree of coincidence of said center positions as a score;
obtaining a peak of said expressed score; and
carrying out pattern matching between pattern on said design data added with said identification information and center position of edge of pattern on said image in accordance with the closest peak, when a plurality of peaks are detected.

4. The pattern matching method according to claim 3, further comprising:
in accordance with identification information of said pattern added with at least two lines, among said contour lines on said design data, judging on whether the region defined by said two lines generated from pattern of said design data is depression, non-pattern portion or protrusion, pattern portion.

5. A non-transitory computer readable medium having instructions embodied thereon, execution of the instructions to cause a computer to carry out functions for pattern matching between a pattern of a design data and a pattern on an image obtained by an image formation apparatus, the functions including;
adding identification information of lines onto contour lines of pattern to said design data;
obtaining center positions of edges of pattern of said design data added with said identification information and pattern on said image; and
carrying out pattern matching such that said obtained center positions coincide with each other.

6. The computer readable medium according to claim 5, wherein the identification information of lines added with contour lines of pattern of said design data is expressed by vector.

7. The computer readable medium according to claim 5, wherein the functions further comprise:
expressing degree of coincidence of said center positions as a score;
obtaining a peak of said expressed score; and
carrying out pattern matching between pattern of said design data added with said identification information and center position of edge of pattern on said image, in accordance with the closest peak, when a plurality of peaks are detected.

8. The computer readable medium according to claim 7, wherein the functions further comprise:
in accordance with identification information of said pattern added with at least two lines, among said contour lines of said design data, judging on whether the region defined by said two lines generated from pattern on said design data is depression, non-pattern portion or protrusion, pattern portion.

* * * * *